United States Patent
Imana

(10) Patent No.: US 10,383,024 B2
(45) Date of Patent: Aug. 13, 2019

(54) SYSTEM AND METHOD FOR EFFICIENT FRONTHAUL COMMUNICATION FOR WIRELESS COMMUNICATION

(71) Applicant: ANALOG DEVICES, INC., Norwood, MA (US)

(72) Inventor: Eyosias Yoseph Imana, Greensboro, NC (US)

(73) Assignee: Analog Devices, Inc., Norwood, MA (US)

( * ) Notice: Subject to any disclaimer, the term of this patent is extended or adjusted under 35 U.S.C. 154(b) by 35 days.

(21) Appl. No.: 14/643,803

(22) Filed: Mar. 10, 2015

(65) Prior Publication Data
US 2016/0269961 A1    Sep. 15, 2016

(51) Int. Cl.
*H04W 36/28* (2009.01)
*H04W 88/08* (2009.01)

(52) U.S. Cl.
CPC ......... *H04W 36/28* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 6,307,877 B1 * | 10/2001 | Philips | G06F 8/10 375/130 |
| 6,714,529 B1 * | 3/2004 | Tanabe | G01L 3/1478 370/343 |
| 7,183,971 B1 | 2/2007 | Lloyd et al. | |
| 8,064,821 B2 | 11/2011 | Roland et al. | |
| 8,275,310 B2 | 9/2012 | Rolland et al. | |
| 8,467,488 B2 | 6/2013 | Rolland et al. | |
| 8,761,141 B2 | 6/2014 | Leroudier | |
| 8,811,558 B2 | 8/2014 | Rolland et al. | |

(Continued)

FOREIGN PATENT DOCUMENTS

| CN | 101895321 A | 11/2010 |
|---|---|---|
| CN | 103329495 A | 9/2013 |
| CN | 104052534 A | 9/2014 |

OTHER PUBLICATIONS

Leroudier, Frederic; Fronthaul: Small Cells' New Best Friend; OSP Magazine; printed Nov. 22, 2014, retrieved from the Internet: <URL:http://www.ospmag.com/issue/article/Fronthaul-Small-Cells-New-Best-Friend-Part-2>.

(Continued)

*Primary Examiner* — Alex Skripnikov
(74) *Attorney, Agent, or Firm* — Knobbe, Martens, Olson & Bear, LLP

(57) ABSTRACT

A system and method of reducing data-rate requirements of fronthauls for wireless communication is disclosed. In one aspect, the system includes a baseband processing unit and a remote radio head remotely located from the baseband processing unit. The remote radio head is configured to transmit and receive communication signals with the baseband processing unit. The system can also include a fronthaul configured to provide a communication channel between the baseband processing unit and the remote radio head for the communication signals, and a matched filter configured to filter out redundant information from the communications signals before the communications signals are provided to the fronthaul.

20 Claims, 3 Drawing Sheets

(56) References Cited

U.S. PATENT DOCUMENTS

| | | | |
|---|---|---|---|
| 9,210,009 B2* | 12/2015 | Pashay-Kojouri | H03F 3/193 |
| 2007/0243824 A1 | 10/2007 | Roland et al. | |
| 2009/0252267 A1 | 10/2009 | Rolland et al. | |
| 2009/0310708 A1* | 12/2009 | Cheng | H04L 1/0041 |
| | | | 375/298 |
| 2010/0056162 A1 | 3/2010 | Rolland et al. | |
| 2013/0101299 A1 | 4/2013 | Bellot et al. | |
| 2013/0243142 A1 | 9/2013 | Rolland et al. | |
| 2013/0259113 A1* | 10/2013 | Kumar | H04L 25/0307 |
| | | | 375/233 |
| 2013/0294253 A1 | 11/2013 | Leroudier | |
| 2013/0294541 A1 | 11/2013 | Blanc et al. | |
| 2014/0328274 A1 | 11/2014 | Blanc et al. | |
| 2014/0334305 A1 | 11/2014 | Leroudier | |
| 2014/0355991 A1 | 12/2014 | Cameirao et al. | |
| 2016/0183248 A1* | 6/2016 | Niu | H04B 7/0413 |
| | | | 370/329 |

OTHER PUBLICATIONS

Wireless access point; Wikipedia, printed on Nov. 22, 2014, retrieved from the Internet: <URL: http://en.wikipedia.org/w/index.php?title=Wireless_access_point&printable=yes>.

Office Action dated Oct. 8, 2018 received in Chinese Application No. 201610135769.3, in 7 pages.

\* cited by examiner

SYSTEM AND METHOD FOR EFFICIENT FRONTHAUL COMMUNICATION FOR WIRELESS COMMUNICATION

BACKGROUND OF THE INVENTION

Field of the Invention

The described technology generally relates to systems and methods for reducing data-rate requirements of fronthauls for wireless communication.

Description of the Related Art

Cellular base-stations include a baseband processing unit (BBU) which transmits and receives wireless data over the cellular network or mobile networks via a remote radio head (RRH). In the standard cellular base-station, the BBU is co-located with the RRH, allowing for a direct communications connection therebetween.

SUMMARY OF CERTAIN INVENTIVE ASPECTS

In certain embodiments, a system is provided that discloses a baseband processing unit (BBU); a remote radio head (RRH) remotely located from the BBU and configured to transmit and receive communication signals with the BBU; a fronthaul configured to provide a communication channel between the BBU and the RRH for the communication signals; and a matched filter configured to filter out redundant information from the communications signals before the communications signals are provided to the fronthaul.

In certain embodiments, a method is provided that discloses digitally processing a transmission signal at a baseband processing unit (BBU); filtering the transmission signal using a matched filter; transmitting the filtered transmission signal to a remote radio head (RRH) via a fronthaul; and transmitting the transmission signal from the RRH to at least one wireless receiver.

In certain embodiments, a system is provided that discloses a baseband processing unit (BBU); a fronthaul operatively coupled to the BBU; a remote radio head (RRH) operatively coupled to the fronthaul, the RRH configured to: i) transmit a first signal received from the BBU to a wireless network and ii) transmit a second signal received from the wireless network to the BBU, the RRH and BBU configured to communicate via the fronthaul; and at least one matched filter configured to filter out redundant information in the first and second signals before the first and second signals are transmitted over the fronthaul.

SUMMARY OF THE DISCLOSURE

In certain embodiments, an apparatus is provided that comprises a remote radio head (RRH) configured to receive a first plurality of multiple-access wireless signals from a plurality of users and to generate a first baseband signal comprising first symbols from the plurality of multiple-access wireless signals; a matched filter configured to reduce redundancy in the first symbols of the first digital baseband signal to generate a second digital baseband signal comprising second symbols, wherein the second symbols include information from the plurality of users, wherein the second digital baseband signal has reduced bandwidth relative to the first digital baseband signal; and a fronthaul driver configured to communicate the second digital baseband signal through a fronthaul.

In certain embodiments, an system is provided that comprises a baseband processing unit (BBU); at least one remote radio head (RRH) remotely located from the BBU and configured to receive a first plurality of multiple-access wireless signals from a plurality of users and to generate a first baseband signal comprising first symbols from the plurality of multiple-access wireless signals; and at least one fronthaul configured to provide at least one communication channel between the BBU and the RRH, wherein the RRH comprises a matched filter configured to reduce redundancy in the first symbols of the first digital baseband signal to generate a second digital baseband signal comprising second symbols, wherein the second symbols include information from the plurality of users, wherein the second digital baseband signal has reduced bandwidth relative to the first digital baseband signal.

In certain embodiments, an method for electronic communication with a remote radio head (RRH) is provided that comprises receiving a first plurality of multiple-access wireless signals from a plurality of users and generating a first baseband signal comprising first symbols from the plurality of multiple-access wireless signals; reducing redundancy in the first symbols of the first digital baseband signal to generate a second digital baseband signal comprising second symbols, wherein the second symbols include information from the plurality of users, wherein the second digital baseband signal has reduced bandwidth relative to the first digital baseband signal; and communicating the second digital baseband signal through a fronthaul.

BRIEF DESCRIPTION OF THE DRAWINGS

These drawings and the associated description herein are provided to illustrate specific embodiments of the invention and are not intended to be limiting.

DETAILED DESCRIPTION

Figure 1:
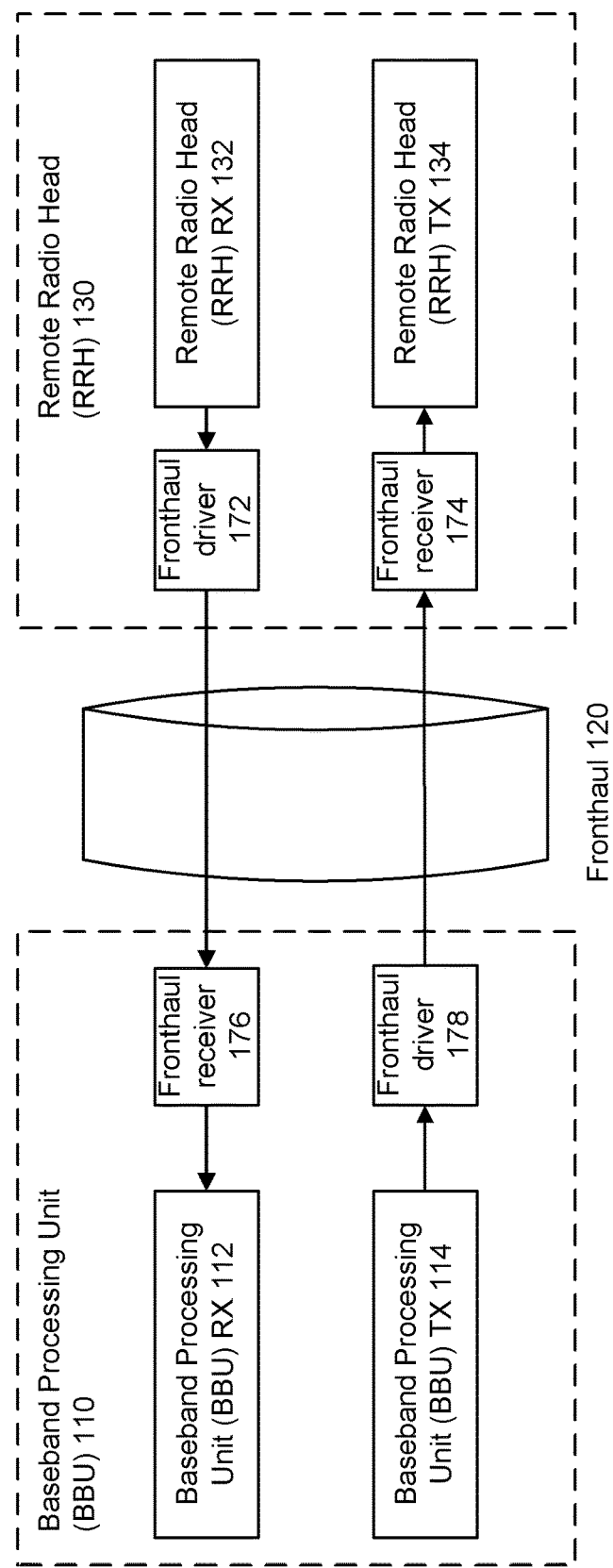
FIG. 1 is a block diagram illustrating a distributed wireless base-station.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. In the drawings, certain embodiments are illustrated with representative block diagrams. These block diagrams are simplified representations of the embodiments in which certain elements not directly related to the described embodiments are not illustrated.

A distributed architecture for cellular base-stations is being developed where the baseband processing unit (BBU) is not co-located with the remote radio head (RRH). There are a number of advantages that can be gained by allowing the RRH to be moved away from the central processing of the BBU. For example, by separating the two components, more flexibility can be achieved for selecting the locations to install each of the RRH and the BBU. In some implementations, a plurality of BBUs can be installed at a central location, allowing the BBUs to share resources such as power and cooling, while maintaining flexibility in the installation locations for each of the RRHs connected to the centralized BBUs. For example, this flexibility is particularly useful in microcellular cellular networks where the area covered by each RRH is less than that of standard base-stations (macrocell) which has its own collocated BBU. A number of RRHs can be respectively deployed at microcell locations and the remote BBUs which communication directly with the RRH can be installed at a single location. Additionally, a single BBU may serve a plurality of RRHs. In these implementations, by remotely locating the RRHs with respect to the BBU, greater flexibility can be achieved by allowing for flexibility in positioning the RRHs while reducing the number of BBUs that would otherwise have to be employed in implementations where the BBUs are collocated with the RRHs.

In order to facilitate the separation of the BBU from an RRH, a communication link is provided to transmit the communication data between the two units. This communications link is referred to as a fronthaul. FIG. 1 illustrates a cellular base-station having such a distributed architecture. Referring to FIG. 1, the base-station includes a broadband processing unit (BBU) 110, a fronthaul 120, and a remote radio head (RRH) 130. Due to the distributed nature of the cellular base-station, the RRH 130 is located at a remote location with respect to the BBU 110. The BBU 110 is linked to the RRH 130 via the fronthaul 120 such that the BBU 110 can communicate with the RRH 130.

Two communication channels are illustrated in FIG. 1, a transmission channel and a reception channel. While the transmission and reception channels are illustrated as being separate communication channels, in certain embodiments the transmission and reception channels may be implemented in a single communication channel. Hereinafter, for the sake of convenience, the transmission and reception channels will be discussed separately.

The BBU 110 includes a BBU receiver (RX) 112 and a BBU transmitter (TX) 114. Similarly, the RRH 130 includes an RRH receiver (RX) 132 and an RRH transmitter (TX) 134. The BBU RX 112 communicates with the RRH RX 132 via the reception channel and the BBU TX 114 communicates with the RRH TX 134 via the transmission channel. For example, the RRH RX 132 can include downconverters and demodulators, such as demodulation of quadrature amplitude modulation QAM. The signals received by the RRH RX 132 can correspond to multiple-access signals, such as those encountered with code division multiple access (CDMA), orthogonal frequency division multiplexing (OFDM), time division multiple access (TDMA), and the like.

The fronthaul 120 is a communication link between the BBU 110 and RRH 130. The fronthaul 120 may be any communication medium that has an appropriate bandwidth for communication between the remotely located BBU 110 and RRH 130. For example, the fronthaul 120 may be embodied as a fiber optic cable, a wireless communication link, a computer network, such as Ethernet, an intranet, the internet, etc., or any combination of the foregoing. As illustrated in the FIG. 1 embodiment, the RRH 130 may include a fronthaul driver 172 and a fronthaul receiver 174 used for communication over the fronthaul 120, such as, but not limited to, drivers and receivers for a computer network, such as the Ethernet. The BBU 110 can also include a fronthaul receiver 176 and a fronthaul driver 178 for communication over the fronthaul 120. As such, the signals transmitted over the fronthaul 120 may depend on the implementation of the fronthaul 120 and may, for example, be digital or analog signals. Additional components not illustrated in FIG. 1 may be required for preparing the signals for transmission on the fronthaul 120 and/or for preparing the signals for the BBU 110 and the RRH 130. For example, when the signal to be transmitted over the cellular network is a digital signal, and the fronthaul 120 is an analog communication link, the fronthaul drivers 172 and 178 and the fronthaul receivers 174 and 176 include the necessary components for preparing the signals for analog transmission over the fronthaul 120 and for the applicable processing of the signals after being transmitted over the fronthaul 120. For example, the fronthaul drivers 172 and 178 may include digital-to-analog converters (DACs) and the fronthaul receivers 174 and 176 may include analog-to-digital converters (ADCs). However, the described technology is not limited thereto.

Any communication standard can be used for encoding/modulating the information to be carried by the signals through the cellular base-station and onto the cellular network. Examples of cellular communication standards include Global System for Mobile communications (GSM) and Long-Term Evolution (LTE). A number of modulation technologies exist for encoding an analog signal or a digital bitstream onto a carrier signal. The following detailed description will refer to quadrature amplitude modulation (QAM) as an exemplary modulation technology, however, the described technology can be equally applied to any modulation technology.

Digital QAM involves encoding a digital bitstream onto two analog carrier signals by modulating the amplitudes of the carrier signals. The two carrier signals are set to be out of phase with each other by 90°. The two carrier signals are referred to as in-phase (I) and quadrature-phase (Q) carrier signals. The digital bitstream is processed to be represented by I and Q components which are used to modulate the amplitudes of the respective I/Q carrier signals.

QAM modulation encodes the bitstream into a plurality of symbols, each of which represents an integer number of bits in the digital bitstream. For example, each symbol can be represented by 2 bits for the QPSK modulation scheme and 6 bits for the 64 QAM scheme. When a QAM modulated signal is received, each symbol of the signal is sampled to retrieve the bits encoded on the modulated signal.

Figure 2:
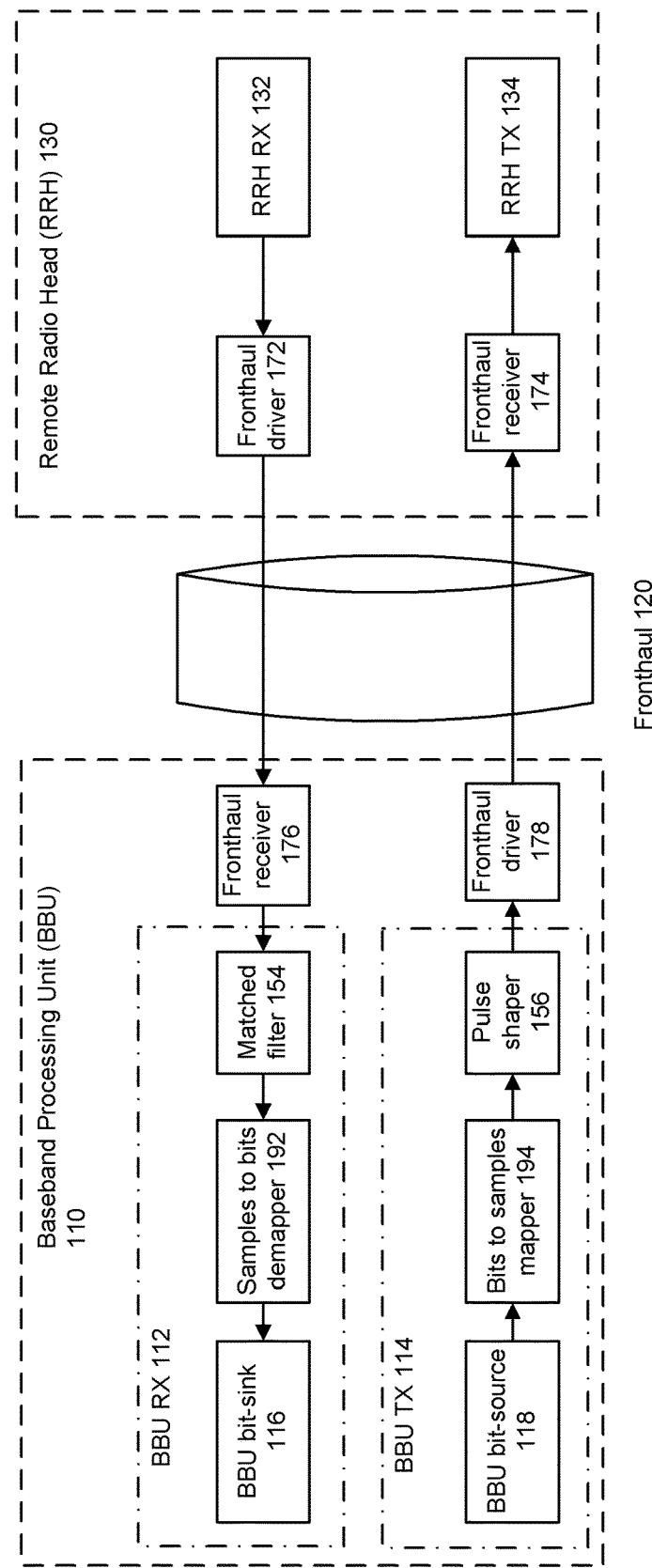
FIG. 2 is a block diagram illustrating a distributed wireless base-station according to an embodiment.

FIG. 2 illustrates a detailed embodiment of FIG. 1. Particularly, FIG. 2 shows an exemplary embodiment of the partitioning of the BBU RX 112 and BBU TX 114. BBU TX 114 may contain a BBU bit-source 118, which generates the information bits that are to be transmitted, and a bits-to-samples mapper 194, which represents QAM symbols using samples. To reduce or even minimize the effects of distortion during further processing of the sample in the BBU TX 114, a sample can be represented by a larger number of bits (often 12-16 bits for both I and Q). The BBU TX may also include a pulse shaper 156 which receives the samples from the bits-to-samples mapper 194 and processes the received samples. In some embodiments, the pulse shaper 156 is a filter (e.g., a pulse shaping filter) which defines the frequency and time domain shape of the transmitted signal. The pulse shaping filter may also over-sample the signal such that more than one sample can be used to represent a single QAM symbol. For example, if the pulse shaper 156 over-samples by a factor of two, and 16 bits are used to represent I and Q, that means that two samples containing a total of 64 bits are used to represent a single QAM symbol at the output of the pulse shaper 156. For these reasons, a 2 bit amount of information in a QAM symbol may be represented by a significantly greater number of bits in the transmitted signal. This redundancy, even though used to help ensure the quality of the signal, can present high bandwidth requirement on the transmit fronthaul link 120.

BBU RX 112 may contain a matched filter 154, a samples-to-bits demapper 192 and a BBU bit-sink 116. The matched filter 154 filters the desired signal and rejects undesired signals. Because the received signal may represent each QAM symbol using more than one sample, the matched filter 154 may also need to down-sample the signal. The down-sampled signal is then passed through the samples-to-bits demapper 192, which extracts the bits from the received sample. To minimize the effects of distortion in the BBU RX 112, a sample can be represented by a greater number of bits (often 12-16 bits for both I and Q) than the number of information bits it contains. For example, if the input of the matched filter 154 is oversampled by two and 16 bits are used to represent I and Q, that means, two samples containing a total of 64 bits are used to represent a single QAM symbol at the input of the matched filter 154. For these reasons, the 2 bit amount of information in a QAM symbol may be represented by significantly more number bits in the received signal. This can present high bandwidth requirement on the reception fronthaul link 120.

As described above, in the standard base-station, QAM samples may be represented by a greater number of bits than the information contained in the QAM sample when transmitted over the fronthaul 120. Accordingly, when the sampled signal is transmitted over the fronthaul 120, the additional bits are also transmitted. Thus, redundant information is transmitted over the fronthaul 120, increasing the bandwidth required to transmit the information over the fronthaul 120. In certain embodiments, the bandwidth requirements of the fronthaul are reduced by removing the redundant information from the sampled signal prior to its transmission over the fronthaul 120.

Figure 3:
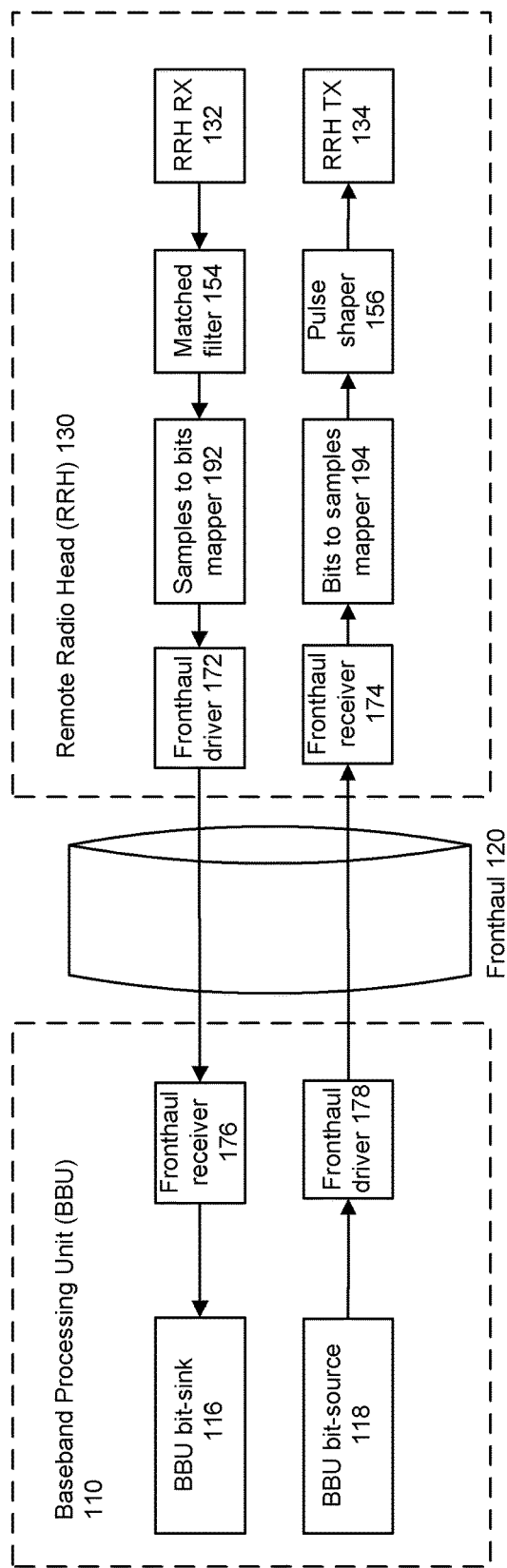
FIG. 3 is a block diagram illustrating a distributed wireless base-station according to another embodiment.

FIG. 3 is a block diagram illustrating a distributed wireless base-station according to another embodiment. In particular, the embodiment of FIG. 3 includes the samples-to-bits demapper 192, the bits-to-samples mapper 194, the matched filter 154, and the pulse shaper 156 in the RRH 130. Each of the samples-to-bits demapper 192, the bits-to-samples mapper 194, the matched filter 154, and the pulse shaper 156 performs substantially the same function as that discussed in connection with the embodiment of FIG. 2. In the embodiment of FIG. 3, the matched filter is placed between the RRH RX 132 and the fronthaul 120. Accordingly, as shown in FIG. 2, the samples are filtered by the matched filter 154 prior to transmission over the fronthaul 120. In certain embodiments, the matched filter 154 is implemented in hardware since the speeds at which the transmission signals are transmitted may be greater than the operational speeds of digital signal processors (DSPs). However, in applications where a DSP can be operated at a sufficient speed, the matched filter 154 may be implemented in a DSP.

In certain implementations, the output of the RRH RX 132, which can be a downconverted signal, may be sampled by, for example, an ADC (not illustrated) to generate samples as an output. The sampling of the symbols can be performed at a sampling rate. Unsynchronized signals should be sampled at a sampling rate at least equal to the Nyquist rate of the sampled signals, which is higher than the bandwidth of the information carried by the sampled signals. For better fidelity, signals can be sampled at rates higher than the Nyquist rate. This oversampling adds additional redundancy that may be introduced into the sampled I/Q signals and reduced by the matched filter 154, which can reduce the amount of bandwidth used by the fronthaul 120.

Additionally, as discussed above, redundancy may be introduced into the transmitted signal prior to the signal's transmission in order to reduce or minimize the effects of distortion due to processing of the signal. Accordingly, the signal received at the RRH RX 132 may include redundant information.

As discussed in connection with FIG. 2, the input to the matched filter 154 may be an oversampled signal. Accordingly, by filtering and down-sampling, the matched filter 154 reduces the redundancy contained in the signal. The sample-to-bit demapper 192 further reduces the redundancy by removing additional bits that are used to represent the QAM symbol. In the embodiment of FIG. 3, the matched filter and the sample-to-bit demapper are located between the RRH RX 132 and the fronthaul 120. Accordingly, the redundancy in the signal is removed before it is transmitted over the fronthaul 120. This lowers the bandwidth requirement of the fronthaul 120.

Additionally, as discussed in connection with FIG. 2, the pulse shaper 156 may over-sample the signal received from the bits-to-samples mapper 194. However, in the embodiment of FIG. 3, the pulse shaper is located between the fronthaul 120 and the RRH TX 134. Accordingly, the redundancy introduced by the pulse shaper 156 is added to the transmitted signal after the signal has already been transmitted over the fronthaul 120. Accordingly, this redundancy is not transmitted over the fronthaul 120, lowering the bandwidth requirements of the fronthaul 120.

During the practical transmission of signals, interference can occur. Additional redundancy may be used to handle the interference. For example, the cellular signal received at the RRH 130 may include interference introduced due to other wireless signals present near the RRH 130 or between the RRH 130 and a wireless receiver (not illustrated).

Embodiments of the invention reduce the bandwidth of the fronthaul 120. According to some embodiments, only the information remaining after the matched filtering of the sampled symbols is transmitted over the fronthaul 120. As such, redundant information which may have been introduced in the sampling of the symbols or that is inherent in the transmitted signal is removed from the received signal and is not transmitted over the fronthaul 120. Additionally, redundancies added to the transmitted signal to reduce the effects of distortion are added after being transmitted over the fronthaul 120, and thus redundant information which may have otherwise been transmitted over the fronthaul 120 is not transmitted over the fronthaul 120. Since less redundant information is transmitted over the fronthaul 120, the bandwidth used for communication between the BBU 110 and the RRH 130 is reduced.

The filtering performed by the matched filter 154 and the pulse shaper 156 can be dependent upon the communication standard used to modulate the cellular signals. For example, for GSM base-stations, the matched filter 154 and the pulse shaper 156 may be embodied as a Gaussian minimum shift keying (GMSK) filter. In OFDM based systems such as LTE and WiMAX base-stations, the matched filter 154 and the pulse shaper 156 can include a collection of parallel filters instead of a single filter. Such a parallel filter bank may be embodied as a fast-Fourier transform (FFT). In OFDM based systems, the output of the matched filter 154 and the input of the pulse shaper 156 involve a parallel stream of multiple symbols. The streams may use the same or different modulation schemes. In another example, in a code matched multiple access (CDMA) system, the matched filter can be a digital matched filter or correlator. In some techniques, such as in correlation for CDMA, tracking and acquisition of the signal are performed by the RRH RX 132.

As described above, a single BBU 110 may be connected to and serve a plurality of RRHs 130. In these embodiments, a plurality of fronthauls 120 respectively corresponding to the RRHs 130 connect the BBU 110 to each of the RRHs 130 to allow for communication therebetween. A subset or all of the fronthauls 120 can be implemented wirelessly, and thus, the fronthauls 120 may operate in different frequency bands. In certain embodiments, the fronthauls 120 are implemented in millimeter wave frequency bands. In lower frequency bands, the spectrum is likely to be crowded by other applications. As such, it may be difficult to allocate a sufficient amount of the spectrum for use by the fronthauls 120. In some embodiments, this may be overcome through the use of multiple-input and multiple-output (MIMO) in the fronthaul 120. For example, the use of MIMO can allow for multiple transmissions, for example, between the BBU and the plurality of RRHs, to coexist at the same frequency. In embodiments implementing MIMO transmission, the fronthaul driver 178 and fronthaul receiver 176 perform MIMO processing.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

Some of the embodiments disclosed herein have been described in connection with specific signals modulated using QAM modulation. However, the principles and advantages disclosed herein are applicable to other types of modulated signals.

Moreover, the foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

What is claimed is:

1. A remote radio head (RRH) for communicating with a baseband processing unit (BBU) with efficient bandwidth, the RRH comprising:
    an RRH receiver configured to receive a first plurality of multiple-access wireless signals and to generate a first baseband receive signal comprising first symbols;
    a matched filter configured to generate a second baseband receive signal comprising second symbols via down-sampling the first symbols, wherein generating the second baseband receive signal comprises removing redundancy from the first baseband receive signal, and wherein the second baseband receive signal has reduced bandwidth relative to the first baseband receive signal;
    a pulse shaper configured to shape a first baseband transmit signal to generate a second baseband transmit signal of increased bandwidth relative to the first baseband transmit signal, wherein generating the second baseband transmit signal comprises introducing redundancy into the first baseband transmit signal; and
    an RRH transmitter configured to transmit a second plurality of multiple-access wireless signals based on the second baseband transmit signal.

2. The RRH of claim 1, further comprising a fronthaul driver configured to communicate the second baseband receive signal through a fronthaul.

3. The RRH of claim 2, wherein the fronthaul driver comprises a driver for a fiber optic cable.

4. The RRH of claim 2, wherein the fronthaul driver comprises an Ethernet driver.

5. The RRH of claim 1, further comprising:
    a digital-to-analog converter (DAC) connected between the pulse shaper and the RRH transmitter; and
    an analog-to-digital converter (ADC) connected between the RRH receiver and the matched filter.

6. The RRH of claim 1, wherein the first symbols are soft symbols and wherein the second symbols are hard symbols.

7. The RRH of claim 1, wherein the first baseband transmit signal and the second baseband receive signal each comprise a digital quadrature amplitude modulation (QAM) signal.

8. The RRH of claim 1, wherein the second baseband receive signal has a lower frequency of samples than the first baseband receive signal.

9. The RRH of claim 1, wherein removing redundancy from the first baseband receive signal comprises removing additional bits used to represent the first symbols.

10. The RRH of claim 1, wherein introducing redundancy into the first baseband transmit signal comprises oversampling the first baseband signal.

11. The RRH of claim 10, wherein oversampling the first baseband signal is performed at a sampling rate that is higher than the Nyquist rate.

12. A wireless communication system with fronthaul communication of efficient bandwidth, the wireless communication system comprising:
    a baseband processing unit (BBU);
    a fronthaul; and
    a remote radio head (RRH) remotely located from the BBU and configured to communicate with the BBU over the fronthaul, wherein the RRH comprises:
        a matched filter configured to down-sample a first baseband receive signal comprising first symbols to generate a second baseband receive signal comprising second symbols, wherein generating the second baseband receive signal comprises removing redundancy from the first baseband receive signal, and wherein the second baseband receive signal has reduced bandwidth relative to the first baseband receive signal and is communicated to the BBU over the fronthaul; and
        a pulse shaper configured to shape a first baseband transmit signal received via the fronthaul to generate a second baseband transmit signal of increased bandwidth relative to the first baseband transmit signal, wherein generating the second baseband transmit signal comprises introducing redundancy into the first baseband transmit signal.

13. The wireless communication system of claim 12, further comprising a plurality of RRHs including the RRH, wherein the plurality of RRHs are remotely located from each other.

14. The wireless communication system of claim 13, further comprising a plurality of fronthauls including the fronthaul, wherein each of the plurality of fronthauls is further configured to provide a communication channel between the BBU and a corresponding one of the RRHs via a multiple-input and multiple-output (MIMO) configuration.

15. The wireless communication system of claim 12, wherein the RRH further comprises a fronthaul driver configured to communicate the second baseband receive signal to the BBU through the fronthaul.

16. The wireless communication system of claim 12, wherein the fronthaul is further configured to provide a transmission communication channel and a reception communication channel, wherein the RRH further comprises an RRH transmitter and an RRH receiver respectively connected to the BBU via the transmission communication channel and the reception communication channel, and wherein the matched filter is connected between the fronthaul and the RRH receiver on the reception communication channel.

17. The wireless communication system of claim 16, wherein the pulse shaper is connected between the fronthaul and the RRH transmitter on the transmission communication channel.

18. The wireless communication system of claim 12, wherein the second baseband receive signal has a lower frequency of samples than the first baseband receive signal.

19. A method for efficient fronthaul communication between a remote radio head (RRH) and a baseband processing unit (BBU), the method comprising:
receiving a first plurality of multiple-access wireless signals and generating a first baseband signal comprising first symbols from the plurality of multiple-access wireless signals;
down-sampling the first symbols using a matched filter to generate a second baseband receive signal comprising second symbols and of reduced bandwidth relative to the first baseband receive signal, wherein generating the second baseband receive signal comprises removing redundancy from the first baseband receive signal;
communicating the second baseband receive signal through a fronthaul;
receiving a first baseband transmit signal over the fronthaul; and
shaping the first baseband transmit signal using a pulse shaper to generate a second baseband transmit signal of increased bandwidth relative to the first baseband transmit signal, wherein generating the second baseband transmit signal comprises introducing redundancy into the first baseband transmit signal.

20. The method of claim 19, further comprising handing off communication for a mobile device to another RRH.

* * * * *